United States Patent [19]

Arima

[11] Patent Number: 5,110,529
[45] Date of Patent: May 5, 1992

[54] PROCESS FOR PRODUCING HOLLOW MOLDINGS

[75] Inventor: Hidetoshi Arima, Obu, Japan

[73] Assignee: Tokai Kogyo Kabushiki Kaisha, Obu, Japan

[21] Appl. No.: 660,865

[22] Filed: Feb. 26, 1991

[30] Foreign Application Priority Data

Feb. 28, 1990 [JP] Japan .................................. 2-48583

[51] Int. Cl.⁵ .................................................. B29C 47/22
[52] U.S. Cl. .............................. 264/167; 264/177.16; 264/209.2; 264/209.8; 425/381; 425/465
[58] Field of Search ................ 264/167, 177.1, 177.16, 264/209.8, 209.2, 177.17, 177.19; 425/113, 465–467, 381

[56] References Cited

U.S. PATENT DOCUMENTS

| | | | |
|---|---|---|---|
| 4,281,978 | 8/1981 | Shigematsu | 425/381 |
| 4,313,327 | 2/1982 | O'Connor | 425/381 |
| 4,531,326 | 7/1985 | Ballocca et al. | 425/465 |
| 4,765,936 | 8/1988 | Ballocca | 425/381 |
| 4,960,375 | 10/1990 | Saito et al. | 425/131.1 |

FOREIGN PATENT DOCUMENTS

| | | | |
|---|---|---|---|
| 2617123 | 10/1977 | Fed. Rep. of Germany | 264/167 |
| 59-131432 | 7/1984 | Japan | 264/167 |
| 62-121030 | 6/1987 | Japan | . |
| 1-242225 | 9/1989 | Japan | 425/466 |
| 1-242226 | 9/1989 | Japan | 425/466 |
| 2-111519 | 4/1990 | Japan | 425/466 |

*Primary Examiner*—Jeffery Thurlow
*Attorney, Agent, or Firm*—Dennison, Meserole, Pollack & Scheiner

[57] ABSTRACT

A process for continuously producing an irregular shaped hollow molding includes the steps of extruding a molding material from a molding opening to form the first portion of the hollow molding, and continuously passing the molding material extruded from the molding opening through a molding clearance or molding opening to form the second portion of the hollow molding after the desired length of first portion is obtained. One of the forming steps of the first and second portions includes a step for discharging an excessive molding material.

6 Claims, 17 Drawing Sheets

PROCESS FOR PRODUCING HOLLOW MOLDINGS

BACKGROUND OF THE INVENTION

The present invention relates to a process for producing a hollow molding, and more particularly, the invention relates to a process for continuously producing an irregular shaped hollow molding or a hollow molding which includes two portion having different cross-sectional configurations or different cross-sectional areas relative to each other.

The conventional process for producing the irregular shaped hollow molding comprises the steps of molding two hollow molding fractions having different cross-sectional configurations relative to each other, and fitting the fractions into bonding dies and bonding the fractions at the ends. Thus, since the conventional process for producing the irregular shaped hollow molding inevitably requires a step of bonding the molding fractions, the irregular shaped hollow molding as produced has a joining portion thereon.

A problem usually associated with the conventional process is that the produced irregular shaped hollow molding exhibits undesirable awkward appearance because of the joining portion formed thereon.

Another problem usually associated with the conventional process is that such a process require increased working time.

Japanese Laid-Open Patent Publication No. 62-121030 teaches a process for continuously producing an irregular shaped hollow molding in which the problems associated with the conventional process are effectively eliminated. The process, however, is not applicable when the two portions of the hollow molding are greatly different from each other in the cross-sectional configurations or cross-sectional areas.

SUMMARY OF THE INVENTION

It is an object of the invention to provide a process for continuously producing an irregular shaped hollow molding which is applicable even when the two portions of the hollow molding are greatly different from each other in cross-sectional configurations or cross-sectional areas.

According to the present invention, there is provided a process for continuously producing an irregular shaped hollow molding which comprises the steps of providing a molding die having a molding opening which is configured to conform with the cross-sectional configuration of the first portion of the hollow molding, extruding a molding material from the molding opening of the molding die to form the first portion of the hollow molding over a desired length, providing a complemental molding die having a molding clearance or molding opening which is configured to conform with at least a part of the cross-sectional configuration of the second portion of the hollow molding and which is communicated with the molding opening, and continuously passing the molding material extruded from the molding opening through the molding clearance or molding opening of the complemental molding die to form the second portion of the hollow molding one of the forming steps of the first and second portions including step for discharging an excessive molding material.

An important feature of the process of the present invention is that the excessive amount of molding material is effectively discharged when the portion having a reduced cross-sectional area is molded, thereby offering the advantage that such a process can be applied to mold the hollow molding including two portions which are greatly different from each other in the cross-sectional configurations or cross-sectional areas.

The present invention will become more fully apparent from the claims and the description as it proceeds in connection with the drawings.

DETAILED DESCRIPTION OF THE PREFERRED EMBODIMENT

Referring now to FIGS. 1 to 9, shown therein is apparatus which is applicable to a molding process according to a first embodiment of the present invention. The process is practiced to mold an irregular shaped hollow molding A which substantially comprises a first portion A1 having a circular cross-sectional configuration and a second portion A2 having a semicircular cross-sectional configuration and a reduced cross-sectional area.

Figure 1:
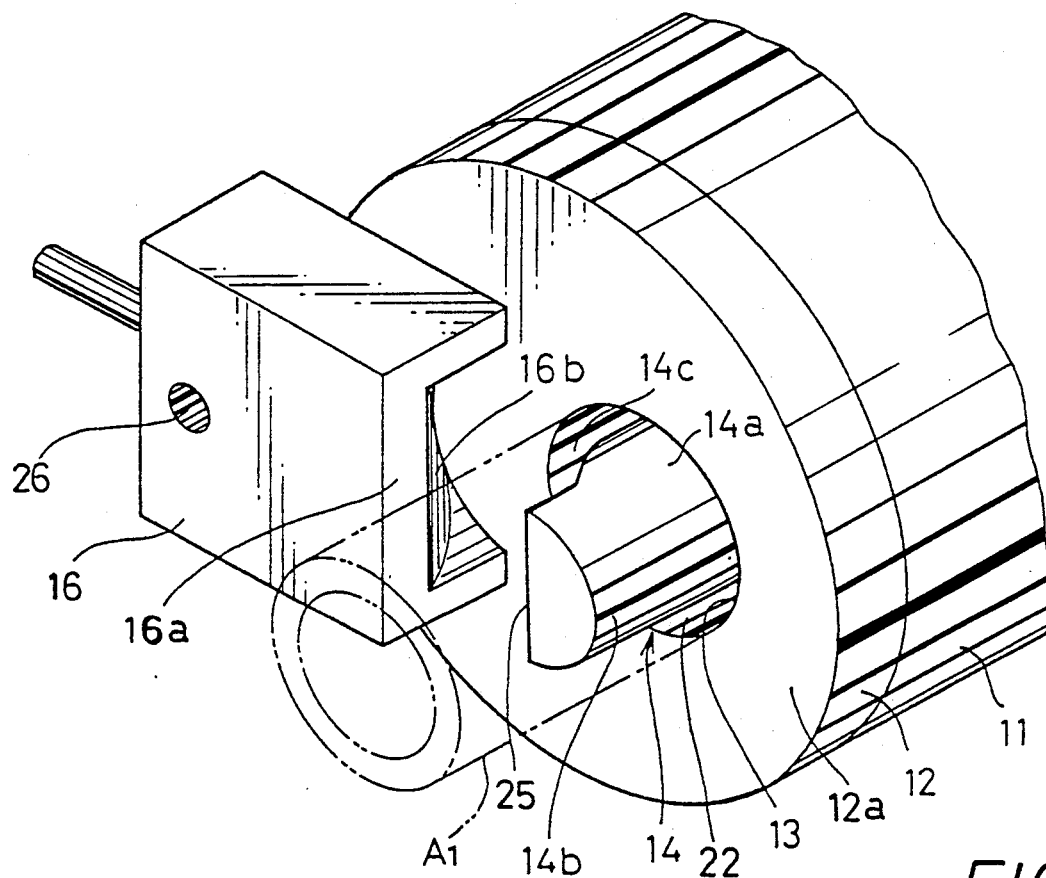
FIG. 1 is a perspective view of the apparatus which is applicable to a molding process according to a first embodiment of the present invention, showing the condition that the forming die is shifted to the retracted position for molding the first portion of the molding.
Figure 3:
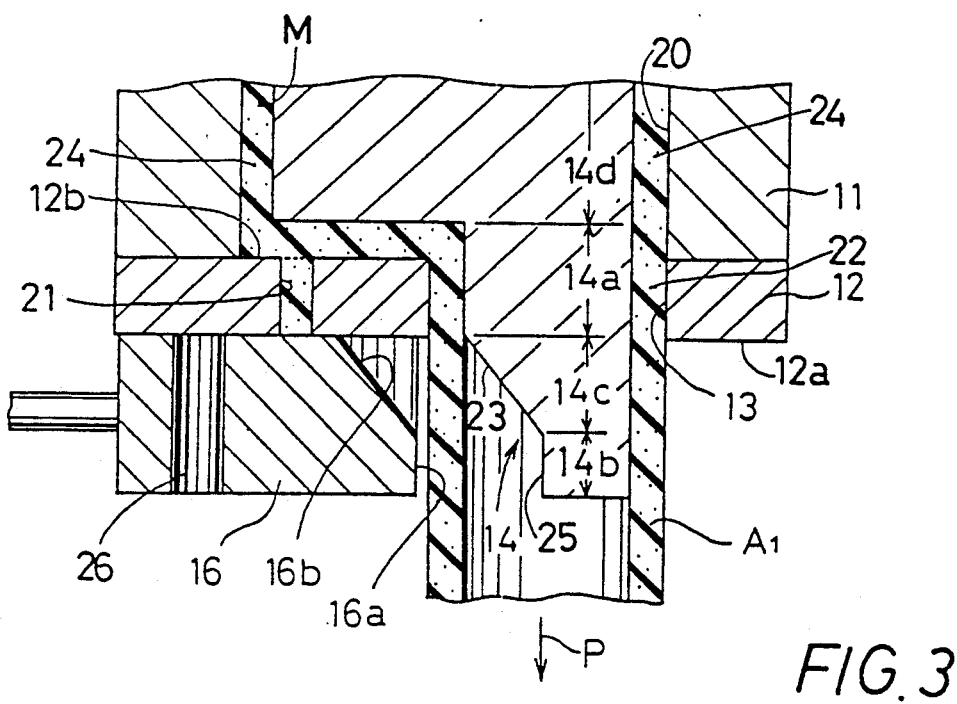
FIG. 3 is a sectional view taken along lines III—III of FIG. 2.

As best shown in FIGS. 1 and 3, the apparatus includes a molding die 11 having a large bore 20 therein. The front end of the molding die 11 is provided with a base plate 12. The base plate 12 has a circular opening 13 which is communicated with the bore 20 and is configured substantially to the outer configuration of the first portion A1 and has an aperture 21 which is also communicated with the bore 20. The molding die 11 is also provided with a core member 14 which is axially inserted into the bore 20 and the opening 13. The core member 14 includes a first section 14a, a second section 14b, a third section 14c and a fourth section 14d. The first section 14a has an outer configuration contoured to conform with the inner configuration of the first portion A1 of the hollow molding A and is positioned in alignment with the opening 13 to form a molding opening 22 therebetween. As will be appreciated, the configuration of the molding opening 22 is identical with the cross-sectional configuration of the first portion A1. The second section 14b has an outer configuration contoured to conform with the inner configuration of the second portion A2 of the hollow molding A and is projected from the front surface 12a of the base plate 12. The second section 14b is connected to the first portion 14a through the third portion 14c having an inclined surface 23. The fourth section 14d has a large diameter and is positioned in the bore 20 of the molding die 11. The fourth section 14d cooperates with the molding die 11 and the base plate 12 to form a passage 24 which communicates with the molding opening 22 and the aperture 21.

Figure 4:
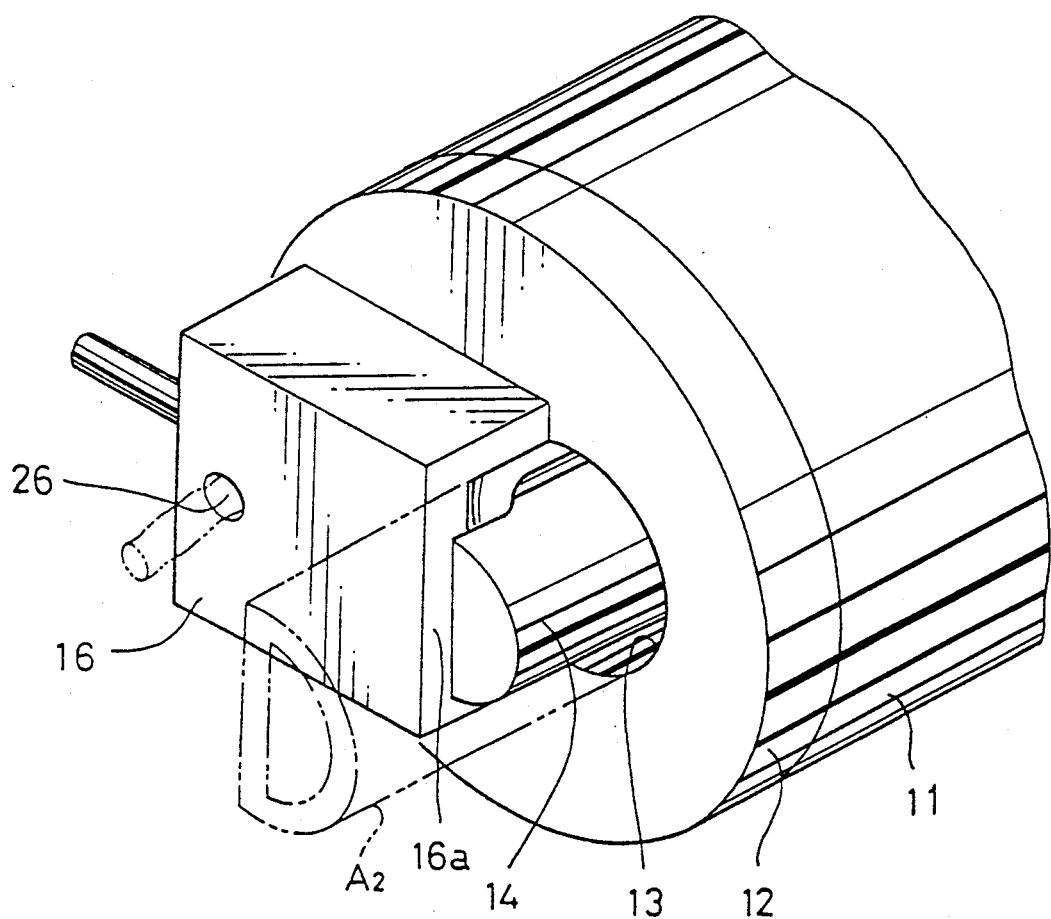
FIG. 4 is a perspective view of the apparatus, showing the condition that the forming die is shifted to the forming position for molding the second portion of the molding.
Figure 6:
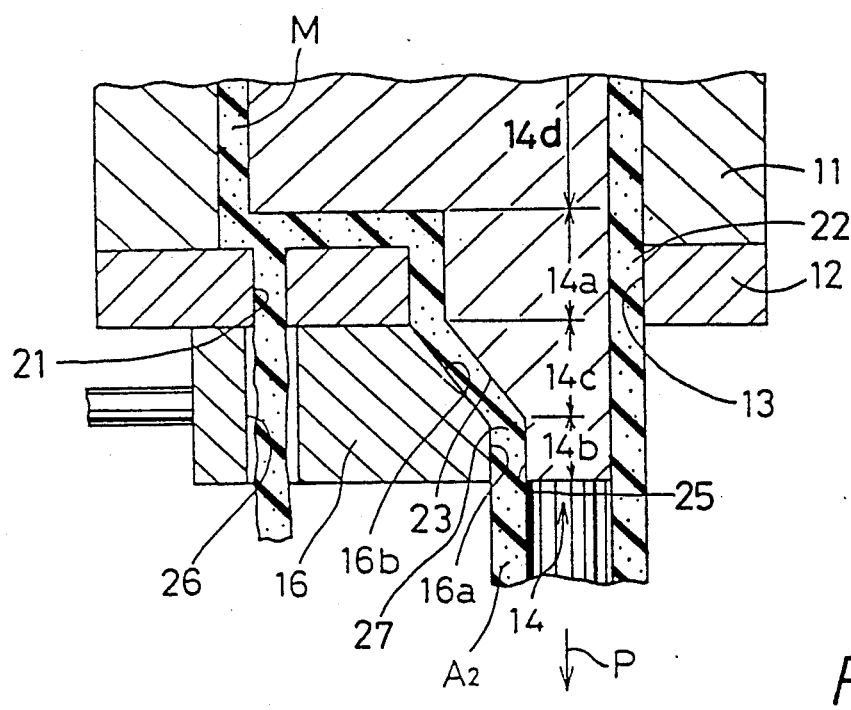
FIG. 6 is a sectional view taken along lines VI—VI of FIG. 5.
Figure 7:
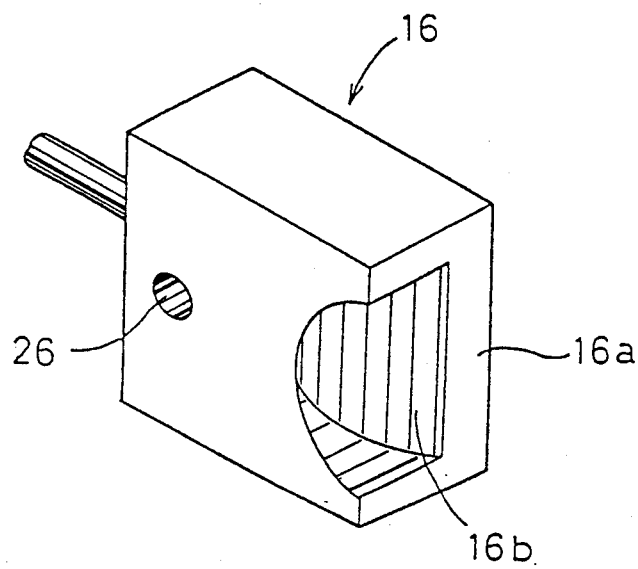
FIG. 7 is a rear perspective view of the forming die.

As shown in FIGS. 1, 3, 6 and 7, the front surface 12a of the base plate 12 is provided with a movable forming die or complemental molding die 16 which is transversely movable along the front $surface 12a between a retracted position as shown in FIGS. 1 and 3 and a forming position as shown in FIGS. 4 and 6. The complemental molding die 16 is formed with a forming surface 16a and an inclined leading surface 16b. These surfaces 16a, 16b are configured substantially to conform with a vertical surface 25 of the second section 14b and the inclined surface 23 of the third section 14c, respectively. Therefore, a forming clearance 27 is formed between the forming surface 16a of the complemental molding die 16 and the second section 14b of the core member 14 when the complemental molding die 16 is shifted to the forming position thereof. The molding die 16 is also formed with a port 26 which is aligned with the aperture 21 to communicate with the passage 24 when the molding die 16 is shifted to the forming position.

The irregular shaped hollow molding A is manufactured by the above described apparatus.

Figure 2:
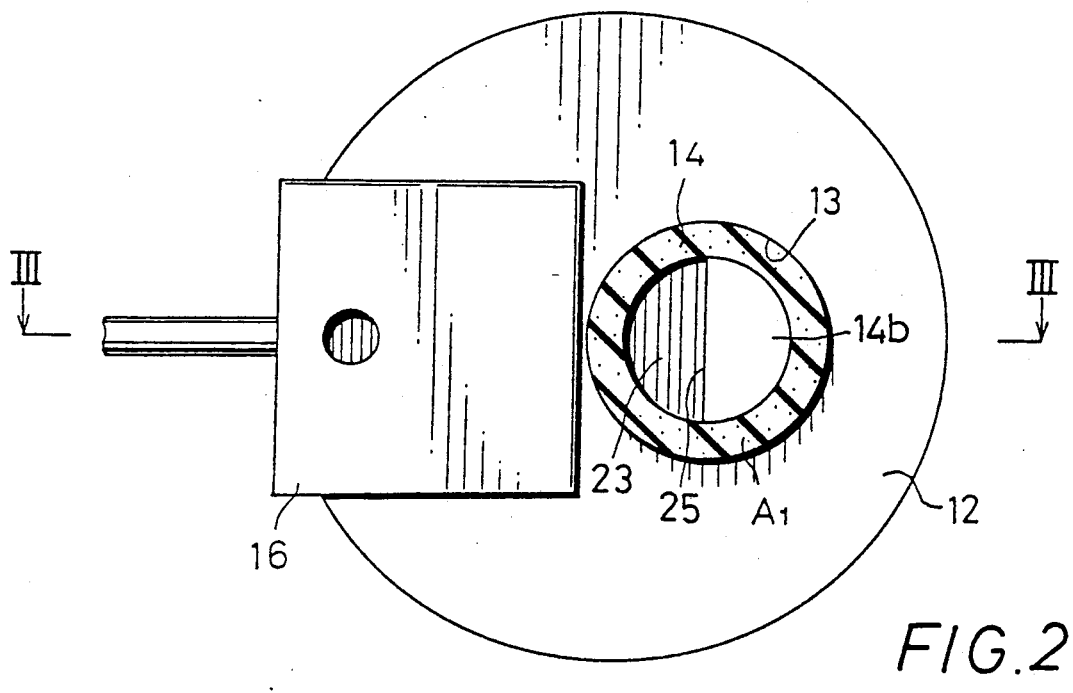
FIG. 2 is an elevational view of FIG. 1.

As shown in FIGS. 1 to 3, the complemental molding die 16 is shifted to the retracted position before a molding material M supplied through the passage 24 is extruded from the molding opening 22 in the direction as indicated by arrow P where the first portion A1 of the hollow molding A is continuously molded. This step is continued until the desired length of the first portion A1 is obtained.

As will be appreciated from FIG. 3, the aperture 21 of the base plate 12, when the complemental molding die 16 is shifted to the retracted position, is completely closed by the molding die 16. Therefore, in the molding step of the first portion A1, all of the supplied molding material M is extruded from the molding opening 22 to mold the first portion A1.

Figure 5:
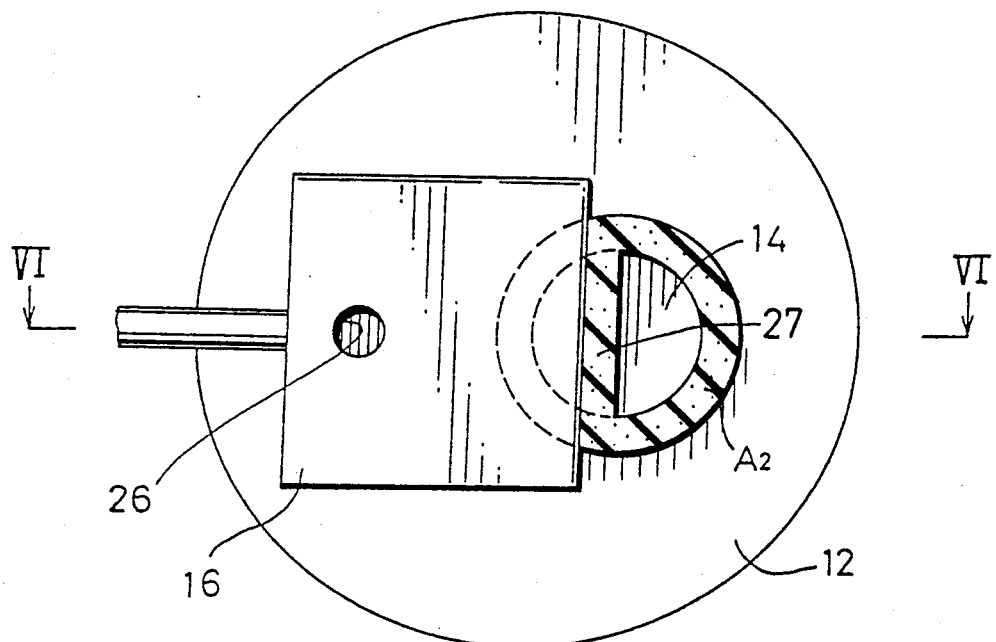
FIG. 5 is an elevational view of FIG. 4.

The complemental molding die 16 is then shifted to the forming position as shown in FIGS. 4 to 6 for forming the forming clearance 27 between the molding die 16 and the second section 14b of the core member 14 before the molding material M is continuously extruded from the molding opening 22. The extruded molding material M is introduced into the forming clearance 27 and continues to pass through the forming clearance 27 to form the second portion A2 of the hollow molding A. This step is continued until the desired length of the second portion A2 is molded, thereby to form the irregular shaped hollow molding A comprising the first and second portions A1. A2 which are integrally formed as a unit.

Figure 8:
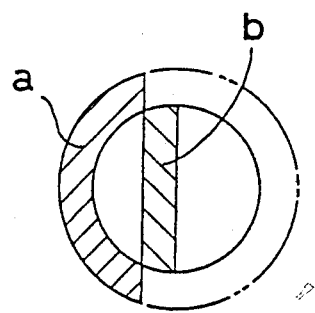
FIG. 8 is a view showing the difference between the cross-sectional area of the first portion and that of the second portion.
Figure 9A:
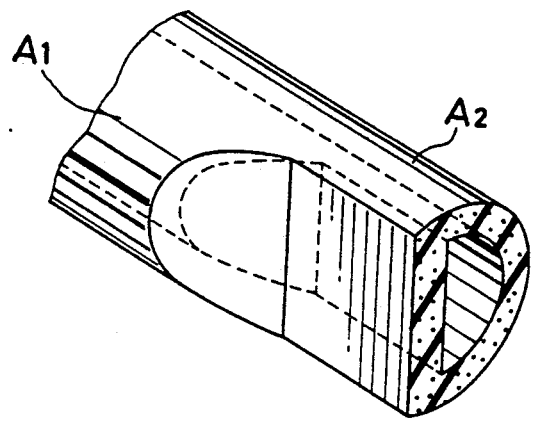
FIG. 9a is a sectional view of the first and second portions of the molding.
Figure 9B:
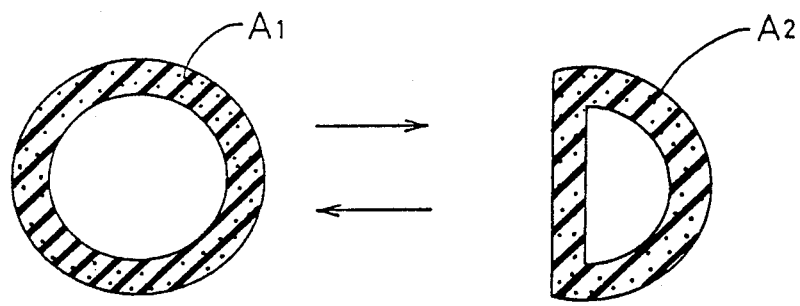
FIG. 9b is a perspective view of the molding.

As will be appreciated from FIG. 6 the aperture 21 of the base plate 12, when the molding die 16 is shifted to the forming position, is communicated with the port 26 of the molding die 16. Therefore, in the molding step of the second portion A2, the desired amount of molding material M is discharged through the aperture 21 and the port 26 and the remainder is extruded from the molding opening 22 to mold the second portion A2. Thus, the aperture 21 acts as a regulator to control the amount of the molding material M to be fed into the molding opening 22. As shown in FIG. 8, since the difference between the cross-sectional area of the first portion A1 and that of the second portion A2 can be expressed by (a−b), an amount of molding material M corresponding substantially to the difference (a−b) has to be discharged in the molding step of the second portion A2. Therefore, the aperture 21 is sized so as to effectively discharge such an excessive amount of molding material M therethrough.

Further, since an increased pressure is generally applied on the molding material M to be extruded from the extruding opening 22 in order to successfully perform the molding step of the second portion A2 having a reduced cross-sectional area, the excessive amount of molding material M discharged through the aperture 21 is substantially less than that corresponding to the difference (a−b). Therefore, if the pressure applied on the molding material M is further increased to mold the second portion A2, the desired amount of molding material M may have to be discharged through the aperture 21 when the first portion A1 is being molded.

Referring now to FIGS. 10 to 15, shown therein is apparatus which is applicable to a molding process according to a second embodiment of the present invention. The process is practiced to mold an irregular shaped hollow molding B which substantially comprises a first portion B1 having a circular cross-sectional configuration and a second portion B2 having a triangular cross-sectional configuration and a reduced cross-sectional area.

Figure 10:
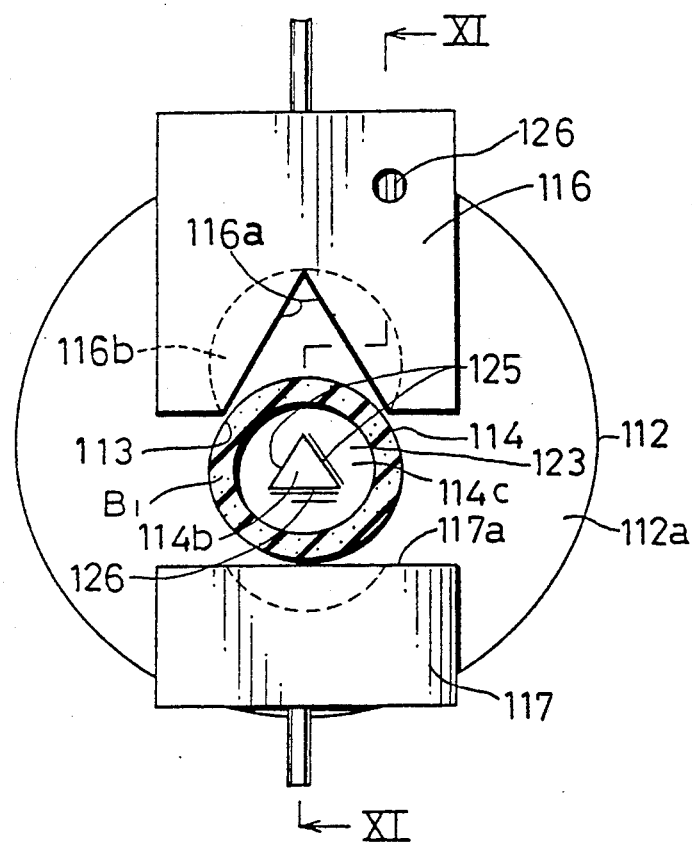
FIG. 10 is an elevational view of the apparatus which is applicable to a molding process according to a second embodiment of the present invention, showing the condition that the forming dies are shifted to the retracted position for molding the first portion of the molding.
Figure 11:
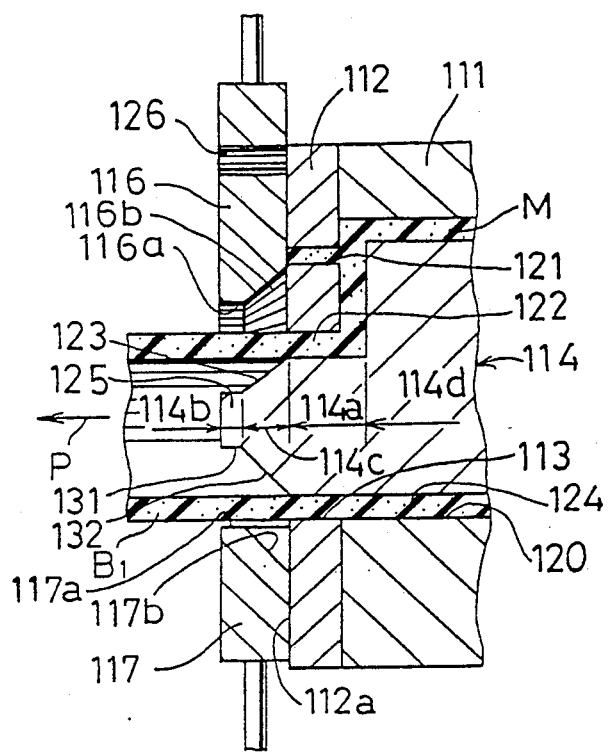
FIG. 11 is a sectional view taken along lines XI—XI of FIG. 10.
Figure 14:
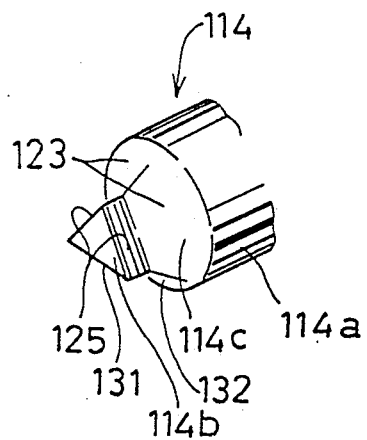
FIG. 14 is a partially perspective view of the core member.

As best shown in FIGS. 10, 11 and 14, the apparatus includes a molding die 111 having a large bore 120 therein. The front end of the molding die 111 is provided with a base plate 112. The base plate 112 has a circular opening 113 which is communicated with the bore 120 and is configured substantially to the outer configuration of the first portion B1 and has an aperture 121 which is also communicated with the bore 120. The molding die 111 is also provided with a core member 114 which is axially inserted into the bore 120 and the opening 113. The core member 114 includes a first section 114a, a second section 114b, a third section 114c and a fourth section 114d. The first section 114a has an outer configuration contoured to conform with the inner configuration of the first portion B1 of the hollow molding B and is positioned in alignment with the opening 113 to form an annular molding opening 122 therebetween. As will be appreciated, the configuration of the molding opening 122 is identical with the cross-sectional configuration of the first portion B1. The second section 114b has an outer configuration contoured to conform with the inner configuration of the second portion B2 of the hollow molding B and is projected from the front surface 112a of the base plate 112. The second section 114b is connected to the first section 114a through the third section 114c having an inclined surface 123. The fourth section 114d has a large diameter and is positioned in the bore 120 of the molding die 111. The fourth section 114d cooperates with the molding die 111 and the base plate 112 to form a passage 124 which communicates with the molding opening 122 and the aperture 121.

Figure 12:
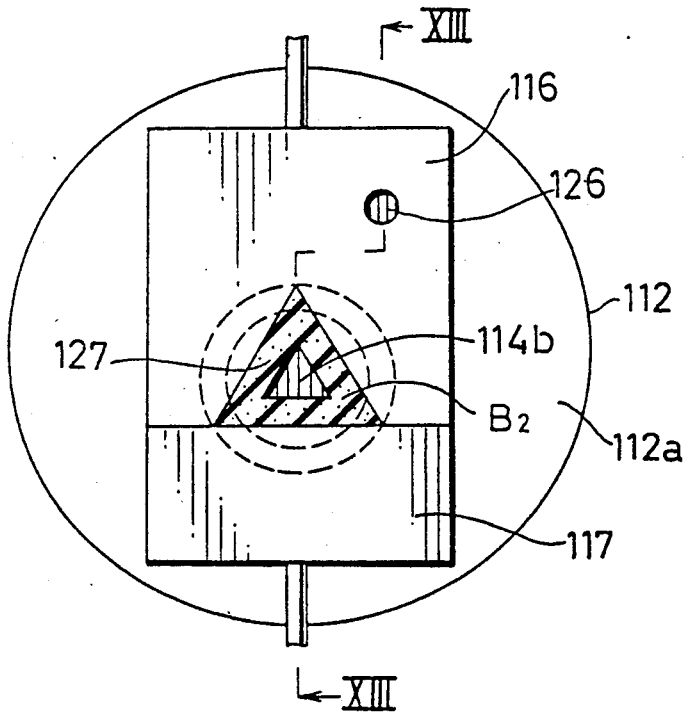
FIG. 12 is an elevational view of the apparatus, showing the condition that the forming dies are shifted to the forming position for molding the second portion of the molding.
Figure 13:
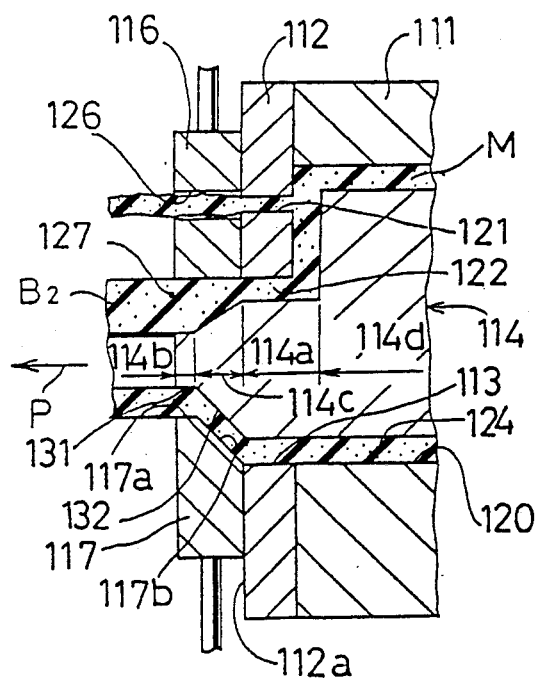
FIG. 13 is a sectional view taken along lines XIII—XIII of FIG. 12.

As shown in FIGS. 10, 11, 12 and 13, the front surface 112a of the base plate 112 is provided with first and second movable forming dies or complemental molding dies 116. 117 which are transversely movable along the front surface 112a between respective retracted positions as shown in FIGS. 10 and 11 and respective forming positions as shown in FIGS. 12 and 13, and which can be completely engaged with each other at the forming positions thereof. The first complemental molding die 116 is formed with a first forming surface 116a and a first inclined leading surface 116b. These surfaces 116a, 116b are configured substantially to conform with a corresponding surface 125 of the second section 114b and a corresponding inclined surface 123 of the third section 114c, respectively. The second molding die 117 is formed with a second forming surface 117a and a second inclined leading surface 117b. These surfaces 117a, 117b are configured substantially to conform with a corresponding surface 131 of the second section 114b and a corresponding inclined surface 132 of the third section 114c, respectively. Therefore, a forming opening 127 is formed between the first and second forming surfaces 116a, 117a of the complemental molding dies 116, 117 and the second section 114b of the core member 114 when the complemental molding dies 116 117 are shifted to the forming position to engage with each other. As will be understood, the forming opening 127 communicates with the molding opening 122 and the cross-sectional configuration of the forming opening 127 is configured to conform with the cross-sectional configuration of the second portion B2 of the hollow molding B (FIG. 12). The complemental molding die 116 is also formed with a port 126 which is aligned with the aperture 121 to communicate with the passage 124 when the complemental molding die 116 is shifted to the forming position.

The irregular shaped hollow molding B is manufactured by the above described apparatus.

As shown in FIGS. 10 and 11, the complemental molding dies 116, 117 are shifted to the retracted positions before a molding material M supplied through the passage 124 is extruded from the molding opening 122 in the direction as indicated by arrow P where the first portion B1 of the hollow molding B is continuously molded. This step is continued until the desired length of the first portion B1 is obtained.

As will be appreciated from FIG. 11, the aperture 121 of the base plate 112, when the first complemental molding die 116 is shifted to the retracted position, is completely closed by the molding die 116. Therefore, in the molding step of the first portion B1, all of the supplied molding material M is extruded from the molding opening 122 to mold the first portion B1.

The complemental molding dies 116, 117 are then shifted to the forming positions as shown in FIGS. 12 and 13 for forming the forming opening 127 between the first and second complemental molding dies 116. 117 and the second section 114b of the core member 114 before the molding material M is continuously extruded from the molding opening 122. The extruded molding material M is introduced into the forming opening 127 and continues to pass through the forming opening 127 to form the second portion B2 of the hollow molding B. This step is continued until the desired length of the second portion B2 is molded, thereby to form the irregular shaped hollow molding B comprising the first and second portions B1, B2 which are integrally formed as a unit.

As will be appreciated from FIG. 13, the aperture 121 of the base plate 112, when the complemental molding die 116 is shifted to the forming position, is communicated with the port 126 of the molding die 116. Therefore, in the molding step of the second portion B2, the desired amount of molding material M is discharged through the aperture 121 and the port 126 and the remainder is extruded from the molding opening 122 to mold the second portion B2. Thus, the aperture 121 acts as a regulator to control the amount of the molding material M to be fed into the molding opening 122. As will be easily understood, the amount of the molding material M discharged from the aperture 121 corresponds substantially to the difference between the cross-sectional area of the first portion B1 and that of the second portion B2.

Referring now to FIGS. 16 to 20, shown therein is apparatus which is applicable to a molding process according to a third embodiment of the present invention. The process is practiced to mold an irregular shaped hollow molding C which substantially comprises a first portion C1 having a circular cross-sectional configuration and a second portion C2 having a rectangular cross-sectional configuration and a reduced cross-sectional area.

Figure 16:
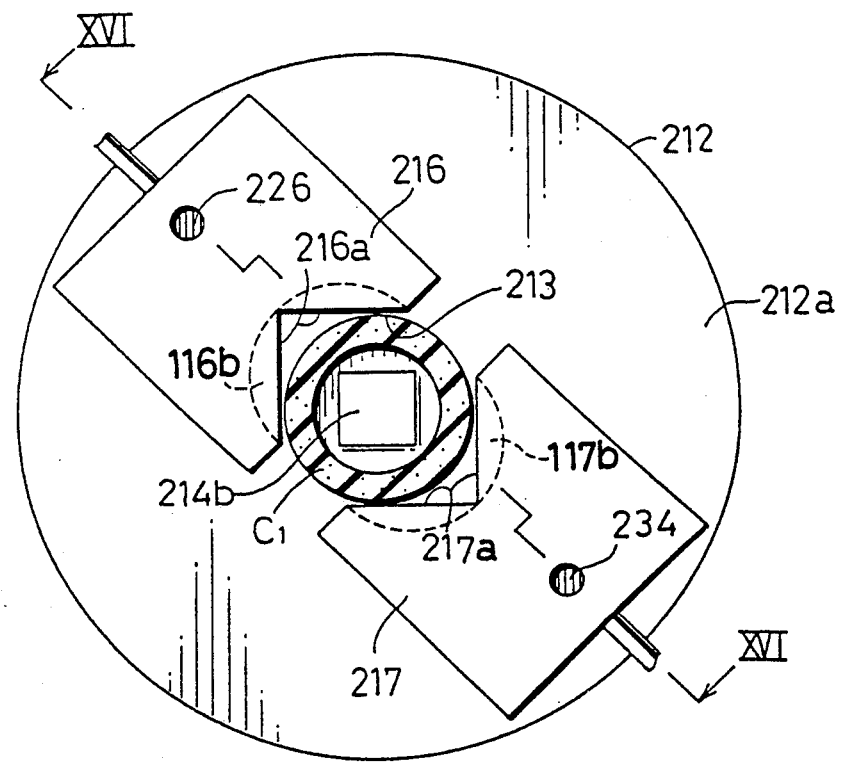
FIG. 16 is an elevational view of the apparatus which is applicable to a molding process according to a third embodiment of the present invention, showing the condition that the forming dies ar shifted to the retracted position for molding the first portion of the molding.
Figure 15A:
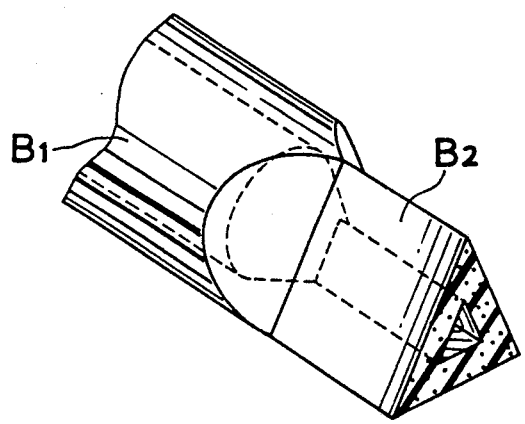
FIG. 15a is a sectional view of the first and second portions of the molding.
Figure 15B:
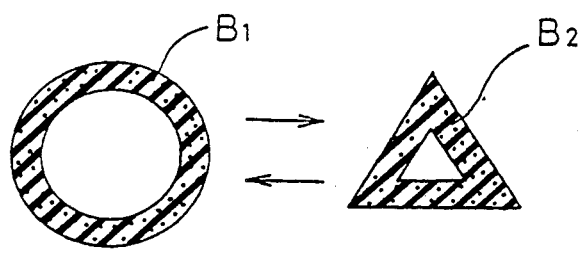
FIG. 15b is a perspective view of the molding.
Figure 17:
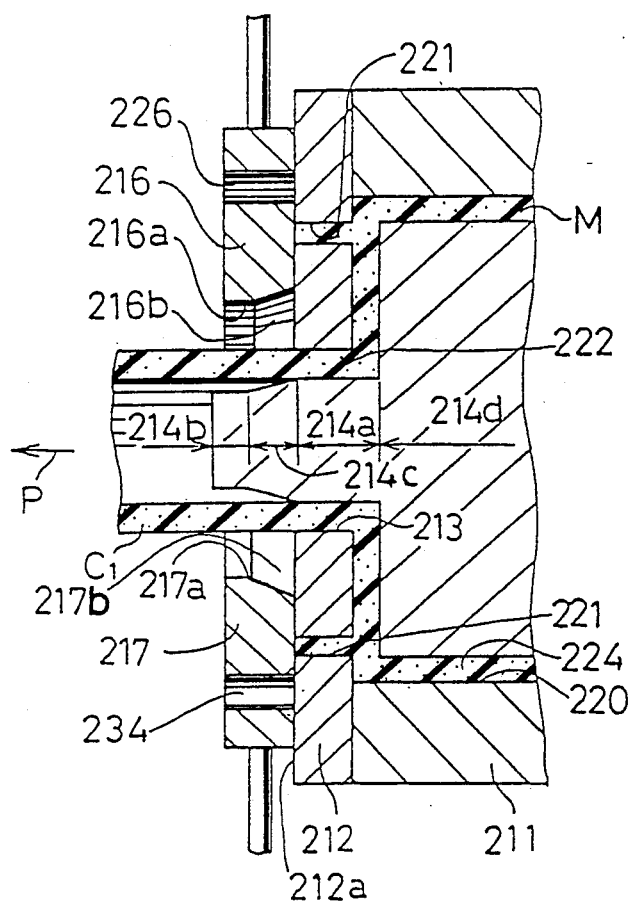
FIG. 17 is a sectional view taken along lines XVII—XVII of FIG. 16.
Figure 20:
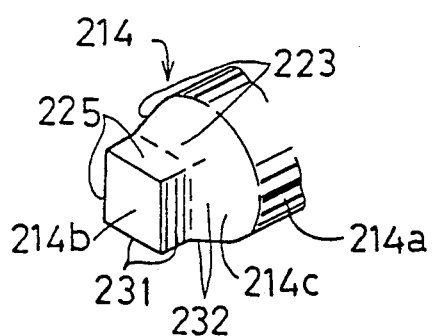
FIG. 20 is a partially perspective view of the core member.
Figure 21A:
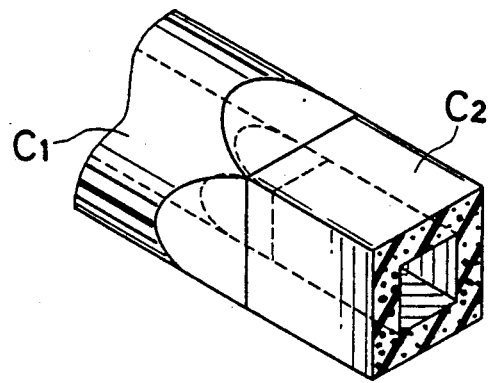
FIG. 21a is a sectional view of the first and second portions of the molding.
Figure 21B:
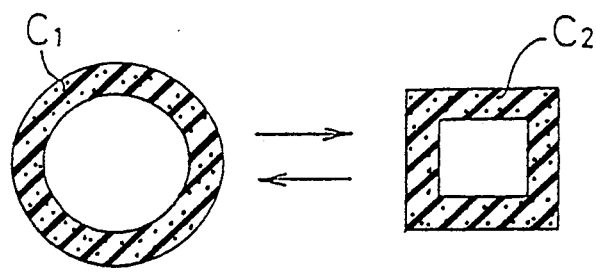
FIG. 21b is a perspective view of the molding.
Figure 22A:
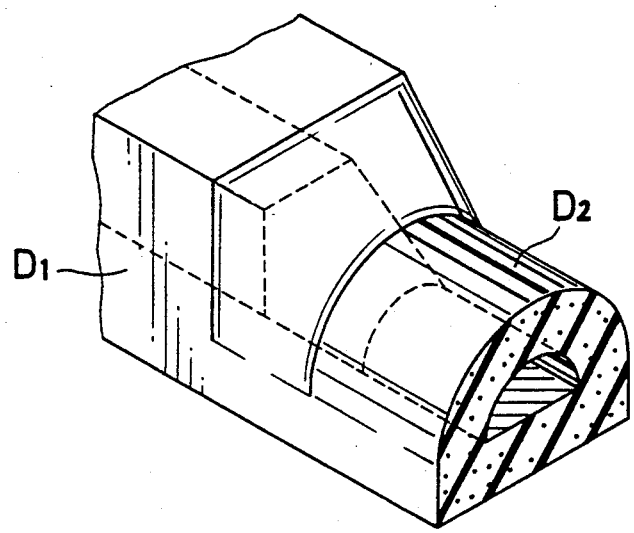
FIG. 22a is a sectional view of the first and second portions of a molding which can be molded by the process of the present invention.
Figure 22B:
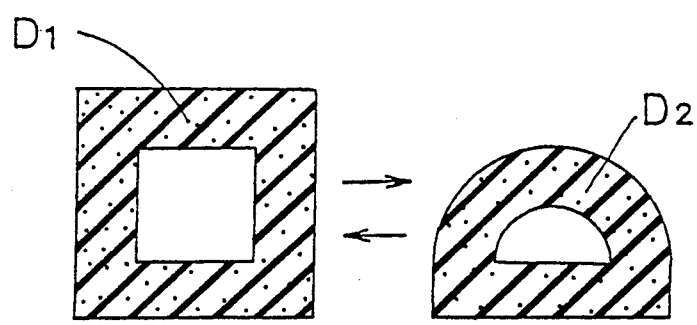
FIG. 22b is a perspective view of the molding.
Figure 23A:
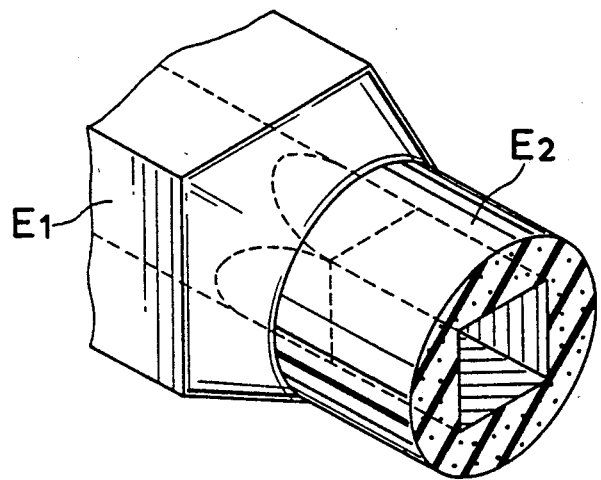
FIG. 23a is a sectional view of the first and second portions of a molding which can be molded by the process of the present invention.
Figure 23B:
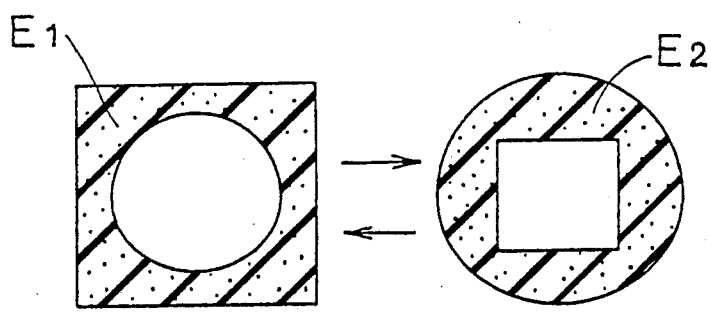
FIG. 23b is a perspective view of the molding.
Figure 24A:
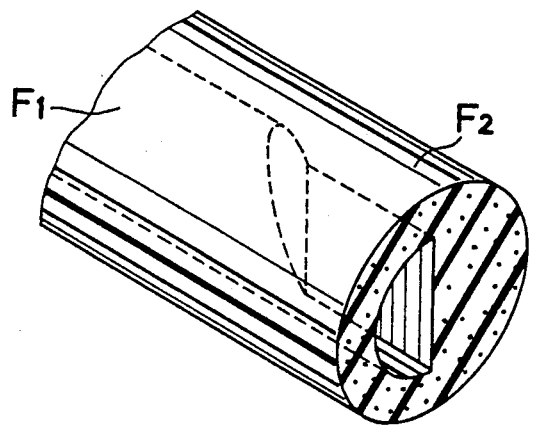
FIG. 24a is a sectional view of the first and second portions of a molding which can be molded by the process of the present invention.
Figure 24B:
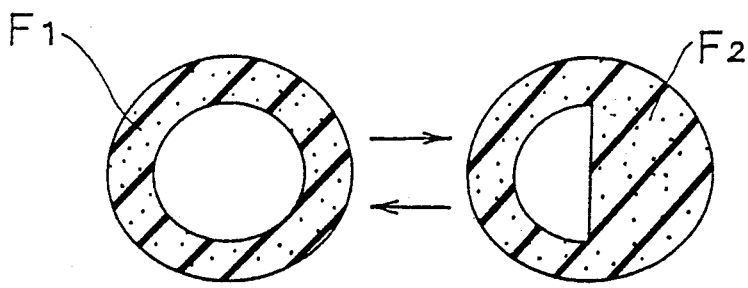
FIG. 24b is a perspective view of the molding.
Figure 25A:
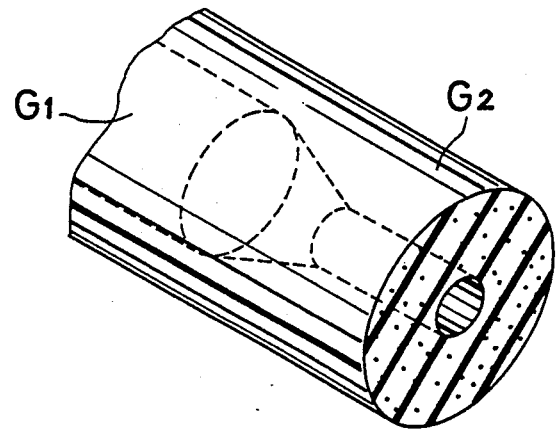
FIG. 25a is a sectional view of the first and second portions of a molding which can be molded by the process of the present invention.
Figure 25B:
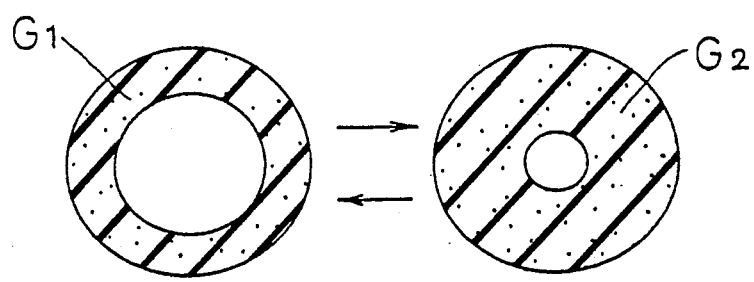
FIG. 25b is a perspective view of the molding.

As best shown in FIGS. 16, 17 and 20, the apparatus includes a molding die 211 having a large bore 220 therein. The front end of the molding die 211 is provided with a base plate 212. The base plate 212 has a circular opening 213 which is communicated with the bore 220 and is configured substantially to the outer configuration of the first portion C1 and has a pair of apertures 221 which are also communicated with the bore 220. The molding die 211 is also provided with a core member 214 which is axially inserted into the bore 220 and the opening 213. The core member 214 includes a first section 214a, a second section 214b, a third section 214c and a fourth section 214d. The first section 214a has an outer configuration contoured to conform with the inner configuration of the first portion C1 of the hollow molding C and is positioned in alignment with the opening 213 to form an annular molding opening 222 therebetween. As will be appreciated, the configuration of the molding opening 222 is identical with the cross-sectional configuration of the first portion C1. The second section 214b has an outer configuration contoured to conform with the inner configuration of the second portion C2 of the hollow molding C and is projected from the front surface 212a of the base plate 212. The second section 214b is connected to the first section 214a through the third section 214c having an inclined surface 223. The fourth section 214d has a large diameter and is positioned in the bore 220 of the molding die 211. The fourth section 214d cooperates with the molding die 211 and the base plate 212 to form a passage 224 which communicates with the molding opening 222 and the aperture 221.

Figure 18:
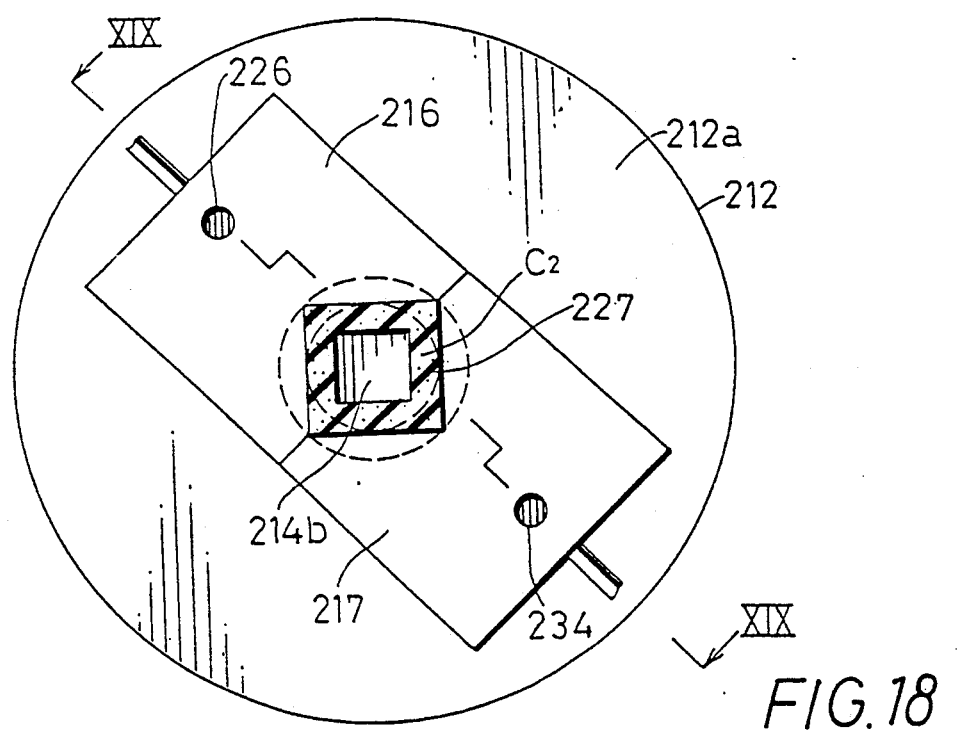
FIG. 18 is an elevational view of the apparatus, showing the condition that the forming dies are shifted to the forming position for molding the second portion of the molding.
Figure 19:
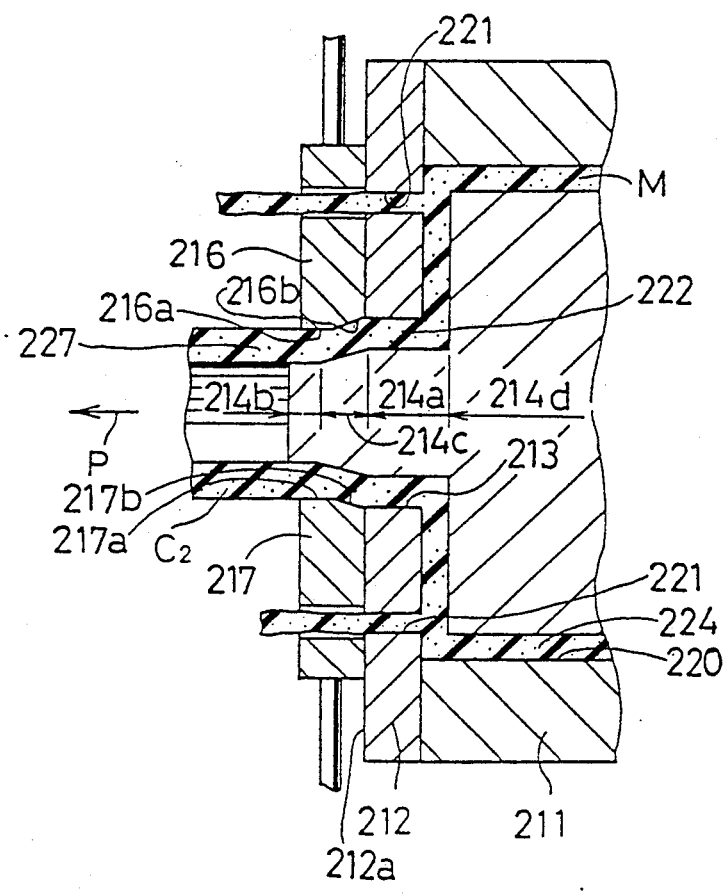
FIG. 19 is a sectional view taken along lines XIX—XIX of FIG. 18.

As shown in FIGS. 16, 17, 18 and 19, the front surface 212a of the base plate 212 is provided with first and second movable forming dies or complemental molding dies 216, 217 which are transversely movable along the front surface 212a between respective retracted positions as shown in FIGS. 16 and 17 and respective forming positions as shown in FIGS. 18 and 19, and which can be completely engaged with each other at the forming positions thereof. The first complemental molding die 216 is formed with a first forming surface 216a and a first inclined leading surface 216b. These surfaces 216a, 216b are configured substantially to conform with a corresponding surface 225 of the second section 214b and a corresponding inclined surface 223 of the third section 214c, respectively. The second complemental molding die 217 is formed with a second forming surface 217a and a second inclined leading surface 217b. These surfaces 217a, 217b are configured substantially to conform with a corresponding surface 231 of the second section 214b and a corresponding inclined surface 232 of the third section 214c, respectively. Therefore, a forming opening 227 is formed between the first and second forming surfaces 216a, 217a of the molding dies 216, 217 and the second section 214b of the core member 214 when the molding dies 216, 217 are shifted to the forming position to engage with each other. As will be understood, the forming opening 227 communicates with the molding opening 222 and the cross-sectional configuration of the forming opening 227 is configured to conform with the cross-sectional configuration of the second portion C2 of the hollow molding C (FIG. 18). The molding dies 216, 217 are also formed with ports 226, 234, respectively, each of which can be aligned with the aperture 221 to communicate with the passage 224 when the molding dies 216, 217 are shifted to the forming positions.

The irregular shaped hollow molding C is manufactured by the above described apparatus.

As shown in FIGS. 16 and 17, the complemental molding dies 216, 217 are shifted to the retracted positions before a molding material M supplied through the passage 224 is extruded from the molding opening 222 in the direction as indicated by arrow P where the first portion C1 of the hollow molding C is continuously molded. This step is continued until the desired length of the first portion C1 is obtained.

As will be appreciated from FIG. 17, the apertures 221 of the base plate 212, when the first and second complemental molding dies 216 217 are shifted to the retracted positions, are completely closed by the molding dies 216, 217. Therefore, in the molding step of the first portion C1, all of the supplied molding material M is extruded from the molding opening 222 to mold the first portion C1.

The complemental molding dies 216, 217 are then shifted to the forming positions as shown in FIGS. 18 and 19 for forming the forming opening 227 between the first and second molding dies 216, 217 and the second section 214b of the core member 214 before the molding material M is continuously extruded from the molding opening 222. The extruded molding material M is introduced into the forming opening 227 and continues to pass through the forming opening 227 to form the second portion C2 of the hollow molding C. This step is continued until the desired length of the second portion C2 is molded, thereby to form the irregular shaped hollow molding C comprising the first and second portions C1, C2 which are integrally formed as a unit.

As will be appreciated from FIG. 19 the apertures 221 of the base plate 212, when the molding dies 216, 217 are shifted to the forming positions, are communicated with the ports 226, 234 of the molding dies 216, 217. Therefore, in the molding step of the second portion C2, the desired amount of molding material M is discharged through the apertures 221 and the ports 226, 234 and the remainder is extruded from the molding opening 222 to mold the second portion C2. Thus, the apertures 221 act as a regulator to control the amount of the molding material M to be fed into the molding opening 222. As will be easily understood, the amount of the molding material M discharged from the aperture 221 corresponds substantially to the difference between the cross-sectional area of the first portion C1 and that of the second portion C2.

The apparatus applicable to the molding process according to each embodiment as described above can be modified to mold irregular shaped hollow moldings D, E, F, G, as shown in FIGS. 22a to 25b. The modification can be accomplished only by changing the base plate, the core member and the movable forming dies. Further in the moldings F. G. each of the first portions FI. GI has increased cross-sectional area. Therefore, in the apparatus to mold the molding F, G, the ports of the forming dies are positioned to align with the apertures of the base plates to discharge the molding material when the forming dies are shifted to the retracted positions to mold the first portions FI, F2.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A process for producing a hollow molding including a first portion and a second portion, said portions having different cross-sectional configuration and being integrally formed as a unit, comprising the steps of:

providing a molding die having an opening which is configured to conform with the outer circumferential configuration of said first portion;

providing a core member including a first portion which has an outer circumferential configuration corresponding to the inner circumferential configuration of said first portion of said hollow molding and a second portion which has an outer circumferential configuration of said second portion of said hollow molding;

arranging said molding die so that said first portion of said core member is positioned in said opening of said molding die for forming a molding opening which is configured to conform with the cross-sectional configuration of said first portion of said hollow molding;

extruding a molding material from said molding opening of said molding die to form said first portion of said hollow molding over a desired length;

providing a complemental holding die having a molding surface which is configured to conform with a part of the outer circumferential configuration of said second portion;

arranging said complemental molding die so that said second portion of said core member is faced to said molding surface of said complemental molding die for forming a molding clearance which is configured to conform with a part of the cross-sectional configuration of said second portion of said hollow molding;

continuously passing the molding material extruded from said molding opening through said molding clearance of said complemental molding die to form said second portion of said hollow molding, and discharging an excessive molding material, said discharging step being included in said forming step for forming one of said first and second portions having a reduced cross-sectional area.

2. The process as defined in claim 1, wherein the cross-sectional area of said first portion is greater than that of said second portion, said discharging step of the excessive molding material being included in said forming step of said second portion.

3. The process as defined in claim 1, wherein the cross-sectional area of said second portion is greater than that of said first portion, said discharging step of the excessive molding material being included in said forming step of said first portion.

4. A process for producing a hollow molding including a first portion and a second portion, said portions having different cross-sectional configuration and being integrally formed as a unit, comprising the steps of:

providing a molding die having an opening which is configured to conform with the outer circumferential configuration of said first portion;

providing a core member including a first portion which has an outer circumferential configuration corresponding to the inner circumferential configuration of said first portion of said hollow molding and a second portion which has an outer circumferential configuration of said second portion of said hollow molding;

arranging said molding die so that said first portion of said core member is positioned in said opening of said molding die for forming a first molding opening which is configured to conform with the cross-sectional configuration of said first portion of said hollow molding;

extruding a molding material from said first molding opening of said molding die to form said first portion of said hollow molding over a desired length;

providing a complemental molding die having an opening which is configured to conform with the outer circumferential configuration of said second portion and which is communicated with said first molding opening;

arranging said complemental molding die so that said second portion of said core member is positioned in said opening of said complemental molding die for forming a second molding opening which is configured to conform with the cross-sectional configuration of said second portion of said hollow molding;

continuously passing the molding material extruded from said first molding opening through said second molding opening of said complemental molding die to form said second portion of said hollow molding; and discharging an excessive molding material, said discharging step being included in said forming step for forming one of said first and second portions having a reduced cross-sectional area.

5. The process as defined in claim 4, wherein the cross-sectional area of said first portion is greater than that of said second portion, said discharging step of the excessive molding material being included in said forming step of said second portion.

6. The process as defined in claim 4, wherein the cross-sectional area of said second portion is greater than that of said first portion, said discharging step of the excessive molding material being included in said forming step of said first portion.

* * * * *